Patented Nov. 11, 1952

2,617,781

UNITED STATES PATENT OFFICE 2,617,781

COPOLYMERS FROM QUATERNARY SALTS OF BUTENE-1 DERIVATIVES

Marion R. Lytton, West Chester, Pa., assignor, by mesne assignments, to The Chemstrand Corporation, Decatur, Ala., a corporation of Delaware No Drawing. Application March 13, 1950, Serial No. 149,440

12 Claims. (Cl. 260—41)

This invention relates to new polymeric materials which are inherently dye-receptive, and to shaped articles formed therefrom.

The new materials are copolymers of a quaternary salt of certain butene-1 derivatives with at least one other copolymerizable $CH_2=C<$ -containing compound. The quaternary salts are defined by the formula

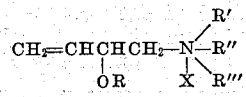

wherein R is hydrogen or an acyl radical containing from 1 to 12 carbons, R' and R'' are monovalent aryl or aralkyl radicals, or alkyl radicals which may be joined through a C, N, or O atom to form a saturated cyclic radical attached to the nitrogen of the butene-1, R''' is an alkyl, aryl, or aralkyl radical, and X represents an anion.

In the above formulae, R''' is a methyl, ethyl, n-propyl, n-butyl, isobutyl, n-amyl, isoamyl, n-hexyl, isohexyl, n-heptyl, n-octyl, n-nonyl, n-decyl, or n-lauryl group, and X is an arylsulfonic acid radical, i. e. an arylsulfonate anion, e. g. benzenesulfonate anion, a p-toluenesulfonate anion, a methyl toluenesulfonate anion, etc., an alkylsulfuric acid radical, i. e. an alkylsulfate anion, e. g. methylsulfate, ethylsulfate, n-propylsulfate, n-butylsulfate, etc., or an iodide anion, a chloride anion, a bromide anion, or other acid anionic radical.

The butene-1 derivative which is heated with the quaternizing reagent to produce the copolymerizable quaternary salts is either the addition product of butadiene monoxide and a secondary amine, or an acyl ester of the addition product. The addition product is obtained by the reaction of butadiene monoxide with a gaseous or dissolved secondary amine. The secondary amine may be a dialkylamine, such as dimethylamine, diethylamine, dipropylamine, di-isopropylamine, dibutylamine, di-isobutylamine, di-secondary butyl amine, and di-myricylamine. Or it may be a diarylamine such as diphenylamine, or a heterocyclic amine in which the hydrogenated ring is fully saturated, such as morpholine, piperidine, ethyleneimine, and pyrrolidine.

The reaction of the butadiene monoxide and the amine involves opening of the oxide ring and addition of the elements of the amine to the structure. This reaction may be carried out at temperatures between 20 and 90° C. It is generally exothermic and external cooling may be required to maintain the temperature in the desired range.

The acyl esters of the addition products may be obtained by reacting the addition product with one mol of the appropriate acid anhydride whereby the ester and organic acid salt are formed in one step, and liberating the ester from the acid salt by neutralization, for example by treating the salt with sodium carbonate. Appropriate acids are those of the aliphatic series containing from 1 to 12 carbons, i. e. organic acids of the aliphatic series from and including formic acid to and including lauric acid, or corresponding anhydrides of the acids other than formic acid.

Examples of other $CH_2=C<$-containing compounds which may be copolymerized with the quaternized butene-1 derivatives to provide synthetic resins in accordance with this invention include acrylonitrile; acids such as acrylic, haloacrylic, and methacrylic acids and esters such as methyl methacrylate, butyl methacrylate, octyl methacrylate, methoxymethyl methacrylate, chlorethyl methacrylate, and the corresponding esters of acrylic and alpha-chloracrylic acids; methacrylonitrile, vinyl and vinylidene halides such as vinyl chloride, vinyl fluoride, vinylidene chloride, vinylidene fluoride, 1-fluoro-1-chlorethylene; vinyl carboxylates such as vinyl acetate, vinyl chloracetate, vinyl propionate, and vinyl stearate; N-vinylimides such as N-vinylphthalimide and N-vinyl succinimide; N-vinyllactams such as N-vinylcaprolactam and N-vinyl butyrolactam; vinyl aryl compounds such as styrene and vinyl naphthalene; and other compounds such as methyl vinyl ketone, chlortrifluorethylene, methyl fumarate, methyl vinyl sulfone, methyl vinyl sulfoxide, methyl vinyl sulfide, fumaronitrile, maleic anhydride, and vinyl trichlorsilane or its hydrolysis product.

The new copolymers may be synthesized from mixtures of the monomers in any desired proportions from 99–1% by weight of one, to 1–99% by weight of the other, by any of the known polymerization procedures including solution polymerization, mass or bulk polymerization, and polymerization in aqueous suspension or emulsion in the presence of a dispersing or emulsifying agent, the suspension or emulsion being maintained by any agitation method, for example by tumbling in a rotating reactor, or through the use of any suitable rotary stirring device. A wide variety of emulsifying agents may be used. In general, any composition having both hydrophilic and hydrophobic radicals may be used, and the expression "emulsifying agent" is intended to include commercial soaps made by the saponification of animal and vegetable oils, such as sodium stearate, potassium laurate, ammonium oleate, and mixtures of these and other salts as they occur in commercially available soaps. Other emulsifying agents are the rosin soaps, the salts of sulfonated hydrocarbons, dialkyl sodium sulfosuccinates, the salts of partial esters of sulfuric acid and high molecular weight alcohols, quaternary ammonium salts such as stearyl dimethyl benzyl ammonium chloride, non-ionic emulsifiers such as ethylene oxide condensates of hexitan monostearates, fatty acids, mercaptans and alcohols, and hexitan monostearates.

In any of the systems mentioned above the copolymerization may be effected by heating the monomers to 30 to 100° C. in the presence of a catalyst and may be performed at alkaline or acid pH. However, the pH at which the copolymerization is performed affects the molecular weight of the polymer and, in some instances, also has an effect on the dye-acceptance and solubility of the copolymer. For example, copolymers of the butene-1 derivatives with acrylonitrile produced at alkaline pH have been found to have comparatively poor affinity for the acid dye-stuffs, whereas a copolymer of the same monomers produced at pH between 2 and 5 has pronounced affinity for the acid dyes. The molecular weights of the copolymers are also depending on the pH, and the copolymers produced at a pH between 2 and 5 invariably have molecular weights which are substantially higher than the molecular weights of the copolymers formed under alkaline conditions, especially when the monomer other than the butene-1 derivative is aliphatic in character. Therefore, when high molecular weights and pronounced affinity for the acid dyestuffs are desirable, it is preferred to carry out the copolymerization at a pH of 2 to 5, which may be accomplished by the addition of acid or an acid-yielding salt to the polymerizing medium.

The copolymerization reaction may be catalyzed by means of any free radical-producing catalyst. Suitable catalysts include the water-soluble peroxy compounds, for example hydrogen peroxide, sodium peroxide, sodium perborate, sodium persulfate and other alkali metal salts of peroxy acids, or other water-soluble peroxy compounds. Azo catalysts, such as azo-2,2'-diisobutyronitrile may be used advantageously in the copolymerization. A wide variation in concentration of catalysts may be used depending on the temperature at which the copolymerization is conducted, the concentration of the monomers in the reaction mass, and the molecular weight desired in the ultimate product. From 0.1 to five percent by weight of catalyst may be used. In general, it is desirable to have a uniform reaction rate and therefore a substantially uniform concentration of the catalyst is desired throughout the reaction. An approximation of these conditions may be obtained by separately preparing the aqueous solution and adding the solution in increments periodically throughout the reaction.

The copolymers of the invention may be produced, also, by redox polymerization in which the copolymerization is conducted at low temperature in the presence of a peroxy type catalyst and a reducing agent which forms a reduction-oxidation system ("redox" system) with the peroxy compounds which accelerate the copolymerization.

The new copolymers may also be produced by a special solution polymerization in which the solvent is saturated with a calculated mixture of the monomers. The catalyst, or a portion thereof is added and the copolymerization is conducted just at reflux temperature by continuously adding a mixture of the monomers in predetermined proportion to the mass at such a rate as to keep the reflux temperature substantially constant. In this manner, the desired uniform concentration of each monomer is maintained in the reactor and the products are substantially homogeneous with respect to both composition and molecular weight.

The copolymerization may be conducted in the presence of molecular weight regulators which act as chain terminators and prevent the formation of very large molecular weight increments. Such regulators are exemplified in the high molecular weight aliphatic mercaptans, such as dodecyl mercaptan, and in carbon tetrachloride, and dithioglycidol.

The copolymers of the invention may contain from 1 to 99%, preferably from 1 to 50% by weight of the butene-1 derivative in the molecule the balance being made up of one or more of the other monomers listed above. The copolymers are variously suitable for the production of synthetic fibers, films and shaped articles generally, as coating compositions, and so on. In a specifically preferred embodiment, the copolymer comprises from 1 to 20% of the butene-1 derivative, from 80 to 99% of acrylonitrile, and when the butene-1 derivative and acrylonitrile total less than 100% of the copolymer, from 1 to 19% of another monoethylenically unsaturated copolymerizable substance, for example, methacrylonitrile, styrene, beta-dimethylaminoethyl methacrylate, etc.

The new copolymers are soluble in a wide variety of solvents, depending on the composition of the copolymer. Those copolymers containing from 1 to 20% of the butene-1 derivative and from 80 to 99% of acrylonitrile, and including ternary polymers containing from 1 to 19% of a third component, are soluble in such solvents as dimethylacetamide and dimethylformamide. The copolymers as a class are receptive to the acid wool dyestuffs, are thermoplastic, have high softening temperatures and are capable of fabrication into compositions and articles suitable for various purposes. However, those copolymers containing from 1 to 20% of the quaternary salt and from 80 to 99% of acrylonitrile are particularly adapted to the preparation of valuable dye-receptive synthetic fibers by extrusion of a solution thereof into an evaporative medium or into a non-solvent for the polymer.

The evaporative medium used in dry spinning filaments or yarns from solutions of the new copolymers may comprise any gaseous or vapor-containing medium which is inert to the copolymer, such as air, nitrogen, steam, etc., or any mixture of such inert media.

The non-solvent which may be used in wet-spinning or wet-casting the solution of the new polymers may be a mixture of water and the spinning solvent, glycerin, or any appropriate liquid which is an extractive for the spinning or casting solvent and a non-solvent for the copolymer.

Further details of the practice of the invention are set forth in the following examples, in which the parts are given by weight.

*Example I*

Five hundred and sixty parts of butadiene monoxide (3,4-epoxybutene-1) were added to 1530 parts of a 25% aqueous dimethylamine solution at a rate such that, with rapid stirring and external cooling, the temperature rose to 45–60° C. That temperature was maintained throughout the reaction.

The mixture was stirred for 30 minutes and then heated to slow refluxing for 30 minutes. It was allowed to stand at room temperature for about 12 hours, after which solid potassium carbonate was added. An aqueous layer separated and was discarded. The nearly anhydrous product was dried for about 12 hours over solid potassium carbonate from which it was filtered, and finally distilled. Yield of 3-hydroxy-4-dimethylamino-butene-1, 510 parts (50%). The product boils at 48° C. at 14 mm.; $n_D^{23}=1.4472$.

Theory: C=62.68; N=12.17; H=11.30.
Found: C=62.71; N=11.89; H=11.20.

Forty-six parts of the 3-hydroxy-4-dimethyl-amino-butene-1 and 54.8 parts of n-butyl bromide were heated together for two hours on a steam bath. The mixture separated into two phases, one of which grew at the expense of the other until a single phase remained. On cooling, the product solidified. It was recrystallized twice from acetone. Yield of dimethylbutyl(2-hydroxy-3-butenyl) ammonium bromide, 46 parts; M. P. 78–80° C.

Theory: C=47.62; H=8.73; N=5.56; Br.=31.75.
Found: C=46.86; H=8.54; N=5.73; Br.=32.57.

To 750 parts of water containing 3.0 parts of potassium persulfate there was added a mixture of 4.5 parts of dimethylbutyl (3-hydroxy-3-butenyl) ammonium bromide and 52.5 parts of acrylonitrile. The mixture was heated to reflux (80° C.). The continuous addition of a mixture consisting of 8.7 parts of dimethylbutyl(2-hydroxy-3-butenyl) ammonium bromide and 100 parts of acrylonitrile was begun at a continuously controlled rate to maintain the reflux temperature substantially constant. The addition required 20 minutes, and the mass was heated for an additional 15 minutes. The copolymer was filtered off and washed. Yield, 138 parts or 83%. By nitrogen analysis it was found to contain 3.5% of dimethylbutyl (2 - hydroxy - 3 - butenyl) ammonium bromide.

*Example II*

A portion of the copolymer of Example I was intimately mixed with dimethylacetamide to obtain an 18% solution. The solution was extruded through a spinneret having 40 orifices, each 0.0045 inch in diameter into a bath consisting of water and 67% of dimethylacetamide, by volume. The fibers were withdrawn, washed, dried and stretched 300% at 140° C. in superheated steam.

The fibers were dyed to an acceptable red shade in a dyebath containing 2% of the acid dyestuff Wool Fast Scarlet G. supra and 15% of 96% sulfuric acid based on the weight of the fibers. The fibers were entered into the bath at room temperature and the bath was brought to the boil in 10 minutes and boiled for 90 minutes.

*Example III*

To 280 parts of the 3-hydroxy-4-dimethyl-amino-butene-1 of Example I there were added 272 parts of acetic anhydride with stirring and external cooling. The addition required about one hour. The mixture was allowed to stand at room temperature for about 12 hours and then distilled. Yield of the acetic acid salt of the acetyl ester, 505 parts (91.5%), B. P. 70° C. at 14 mm.; $n_D^{24.4}=1.4349$.

Theory: C=55.30; H=8.75; N=6.45.
Found: C=55.08; H=9.17; N=6.45.

335 parts of the salt produced as above were treated with a cooled solution of 120 parts of potassium carbonate in 250 parts of water with stirring for 30 minutes. The mixture formed layers and the organic layer was separated. On treating the aqueous layer with solid potassium carbonate, a further organic layer was obtained and combined with the first. The combined organic layers were dried over solid potassium carbonate for about 12 hours, filtered, and distilled. Yield of 3-acetoxy-4-dimethylamino-butene-1, 178 parts (65%), B. P. 66–68° C. at 14 mm.; $n_D^{26}=1.4309$.

Theory: C=61.00; H=9.55; N=8.92.
Found: C=61.54; H=9.40; N=8.68.

A mixture of 31.4 parts of the 3-acetoxy-4-dimethylamino-1 and 25.2 parts of benzyl chloride was heated on the steambath for one hour. At the end of this time, the reaction mixture had separated into two layers. Ethanol (50 parts) was added and the heating was continued for two hours. The alcohol was then distilled off under reduced pressure and the residue was heated at 100° C. under 1 mm. pressure for 5 hours. On cooling to room temperature, the product dimethylbenzyl(2-acetoxy - 3 - butenyl) ammonium chloride was obtained as a glassy solid.

To a solution of 16.3 parts of dimethylbenzyl-(2-acetoxy-3-butenyl) ammonium chloride in 450 parts of distilled water there were added 24.7 parts of acrylonitrile. The solution was placed in a vessel equipped with stirrer, condenser, and dropping funnel, and heated to reflux at 80° C. A solution of 2 parts of potassium persulfate in 50 parts of water, at 60° C. was added, after which the continuous addition of 67 parts of acrylonitrile was begun at a rate such that with external heating, the reflux temperature was maintained at 80° C. The addition of the acrylonitrile required 30 minutes. The copolymer was filtered off and washed. Yield, 59 parts or 54.6%. It had a specific viscosity of 0.27 at 0.1% concentration in dimethylformamide and a nitrogen content of 25% corresponding to 6.7% of dimethylbenzyl(2-acetoxy-3-butenyl) ammonium chloride.

An 18% solution of the copolymer in dimethylacetamide was cast to films which were dyed to an acceptable red shade in a dyebath as described in Example II.

The invention is defined by the appended claims.

I claim:

1. A copolymer containing, by weight in the polymer molecule, from 1 to 99 percent of dimethylbenzyl(2 - hydroxy-3-butenyl) ammonium chloride and from 99 to 1 percent of acrylonitrile, and, when the quaternary salt and acrylonitrile total less than 100, from 1 to 19 percent of a third monoethylenically unsaturated polymerizable substance.

2. A copolymer containing, by weight in the polymer molecule, from 1 to 20 percent of dimethylbenzyl(2-hydroxy-3-butenyl) ammonium chloride and from 80 to 99 percent of acrylonitrile.

3. A copolymer containing, by weight in the polymer molecule, about 3.5 percent of dimethylbenzyl(2-hydroxy-3-butenyl) ammonium chloride and about 96.5 percent of acrylonitrile.

4. A copolymer containing, by weight in the polymer molecule, from about 1 to 99 percent of dimethylbenzyl(2-acetoxy-3-butenyl) ammonium chloride and from 99 to 1 percent of acrylonitrile and, when the quaternary salt and acrylonitrile total less than 100, from 1 to 19 percent of a third monoethylenically unsaturated, polymerizable substance.

5. A copolymer containing, by weight in the polymer molecule, from 1 to 20 percent of dimethylbenzyl(2-acetoxy-3-butenyl) ammonium chloride and from 80 to 99 percent of acrylonitrile.

6. A copolymer containing, by weight in the polymer molecule, about 7 percent of dimethylbenzyl(2-acetoxy-3-butenyl) ammonium chloride and about 93 percent of acrylonitrile.

7. The process of claim 10, wherein the other monomer containing a single $CH_2=C<$ group and copolymerizable with the quaternary salt is acrylonitrile.

8. A copolymer containing, in the polymer molecule, (a) a quaternary salt having the formula

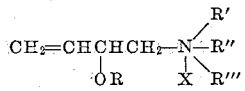

wherein R is a substitutent taken from the group consisting of hydrogen and acyl radicals containing from 1 to 12 carbons, R' and R" are substituents taken from the group consisting of aryl and aralkyl radicals and alkyl radicals which may be joined through an atom selected from the group consisting of C, N, and O atoms to form a saturated cyclic radical, R''' is selected from the group consisting of alkyl, aryl, and aralkyl radicals, and X is an anion, and (b) at least one other monomer containing a single $CH_2=C<$ group and which is copolymerizable with the quaternary salt, the quaternary salt being present, by weight, in an amount equal to from 1 to 99 percent of the total weight of the copolymer.

9. A copolymer as in claim 8, wherein the monomer other than the quaternary salt is acrylonitrile.

10. The process for preparing a copolymer containing, in the polymer molecule, a quaternary salt having the formula

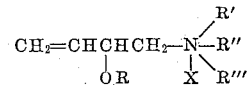

wherein R is a substituent taken from the group consisting of hydrogen and acyl radicals containing from 1 to 12 carbons, R' and R" are substituents taken from the group consisting of aryl and aralkyl radicals and alkyl radicals which may be joined through an atom selected from the group consisting of C, N, and O atoms to form a saturated cyclic radical, R''' is a substituent taken from the group consisting of alkyl, aryl, and aralkyl radicals, and X is an anion, which comprises heating a mixture comprising (a) the selected quaternary salt and (b) at least one other monomer containing a single $CH_2=C<$ group and which is copolymerizable with the quaternary salt, wherein the quaternary salt is present by weight in an amount equal to from 1 to 99 percent of the total weight of the mixture, and in the presence of a polymerization catalyst for the mixture of polymerizable materials.

11. A fiber composed of the copolymer of claim 9, dyed with an acid dye.

12. A fiber composed of the copolymer of claim 4, dyed with an acid dye.

MARION R. LYTTON.

REFERENCES CITED

The following references are of record in the file of this patent:

UNITED STATES PATENTS

| Number | Name | Date |
|---|---|---|
| 2,497,926 | Bruson | Feb. 21, 1950 |
| 2,504,082 | Neher et al. | Apr. 11, 1950 |